United States Patent [19]

Kawamura et al.

[11] 4,452,217

[45] Jun. 5, 1984

[54] EXHAUST GAS RECIRCULATION CONTROL SYSTEM FOR A DIESEL ENGINE AND CONTROL METHOD THEREFOR

[75] Inventors: Yoshihisa Kawamura; Giichi Shioyama; Toyoaki Nakagawa, all of Yokosuka; Masao Nakajima, Atsugi, all of Japan

[73] Assignee: Nissan Motor Company, Limited, Kanagawa, Japan

[21] Appl. No.: 441,038

[22] Filed: Nov. 12, 1982

[30] Foreign Application Priority Data

Nov. 17, 1981 [JP] Japan ............... 56-184099

[51] Int. Cl.$^3$ ........................... F02M 25/06
[52] U.S. Cl. .................. 123/571; 123/569; 364/431.06
[58] Field of Search ............. 123/571, 569; 364/431.06

[56] References Cited

U.S. PATENT DOCUMENTS

| | | | |
|---|---|---|---|
| 4,181,944 | 1/1980 | Yamauchi et al. | 123/569 |
| 4,318,385 | 3/1982 | Yamaguchi | 123/571 |
| 4,333,438 | 6/1982 | Perez et al. | 123/569 |
| 4,387,693 | 6/1983 | Romblom | 123/569 |
| 4,387,694 | 6/1983 | Yoshiba et al. | 123/569 |
| 4,388,909 | 6/1983 | Ogasawara et al. | 123/569 |
| 4,388,912 | 6/1983 | Kimura et al. | 123/571 X |

FOREIGN PATENT DOCUMENTS 73823  5/1982  Japan .................... 123/569

OTHER PUBLICATIONS

"1981 Datsun 810 Diesel Service Manual," Nissan Motor Company, Ltd., 1981, pp. EC-2 to EC-8.

*Primary Examiner*—Wendell E. Burns
*Attorney, Agent, or Firm*—Lowe, King, Price & Becker

[57] ABSTRACT

In an exhaust gas recirculation control system in which a fuel injection quantity is determined on the basis of engine speed and engine load, a throttle-closed range is determined on the basis of engine speed and fuel injection quantity. An exhaust gas recirculation control valve has an electromagnetically operable valve actuator, the duty cycle of which is controlled by a control signal. The duty cycle of the valve actuator is variable in accordance with engine operational condition either in or out of the throttle-closed range. An electromagnetically operated actuator is associated with the throttle valve for controlling the operation of the latter. The actuator is operable between a throttle-open position and a throttle-closed position to operate the throttle valve depending on whether the engine operation conditions are within or out of the throttle-closed range.

14 Claims, 7 Drawing Figures

EXHAUST GAS RECIRCULATION CONTROL SYSTEM FOR A DIESEL ENGINE AND CONTROL METHOD THEREFOR

BACKGROUND OF THE INVENTION

The present invention relates generally to an exhaust gas recirculation control for an internal combustion engine, particularly for a diesel engine. More specifically, the invention relates to an exhaust gas recirculation control for controlling the exhaust gas recirculation rate in precise correspondence to variation of the engine operating condition for emission control.

"DATSUN 810 DIESEL SERVICE MANUAL", published on March, 1981 by Nissan Motor Co., Ltd., as publication No. SM1E-910SUO, shows an exhaust gas recirculation control for a diesel engine on pages EC-2 to EC-8. This discloses an exhaust gas recirculation control for controlling formation of NOx emission and includes an exhaust gas recirculation control valve, a throttle valve with a throttle diaphragm, and solenoid valves for controlling the exhaust gas recirculation valve and the throttle diaphragm. In this exhaust gas recirculation control, the exhaust gas recirculation rate is selected from three allowable stages, namely a HIGH EGR stage in which the exhaust gas recirculation rate is high, a LOW EGR stage in which the exhaust gas recirculation rate is low and a ZERO EGR stage in which the exhaust gas is not recirculated at all. The HIGH EGR is obtained in the combination of closing the throttle valve and open the exhaust gas recirculation valve. The LOW EGR is attained by opening the throttle valve and opening of the exhaust gas recirculation control valve. The ZERO EGR is attained by closing the exhaust gas recirculation control valve.

For precise control of the exhaust gas recirculation rate in accordance with engine operating conditions, three-stage variation of the exhaust gas recirculation rate is not enough. Particularly, it would be desirable to adjust the exhaust gas recirculation rate in strict correspondence to engine operating conditions in the LOW EGR stage. Therefore, according to the present invention, the throttling rate of the exhaust gas recirculation control valve is controlled by control signal which in more detail controls the duty cycle of valve actuator of the exhaust gas recirculation control valve.

SUMMARY OF THE INVENTION

Therefore, it is an object of the present invention to provide an exhaust gas recirculation control system, in which the exhaust gas recirculation rate in the engine operational range between the full rate recirculating range and zero recirculation range is controlled in precise accordance with the engine operating conditions.

Another object of the present invention is to provide an exhaust gas recirculation control system which can be simplified while maintaining adequate emission prevention by controlling the exhaust gas recirculation control valve continuously while controlling the throttle valve only between a fully-opened position and a partially-closed position.

A further object of the present invention is to provide an exhaust gas recirculation control system in which a throttle-closed engine operation range and a throttle-open engine operation range are defined with respect to a fuel injection amount, and the throttling rate of the exhaust gas recirculation control valve is controlled relative to the throttle valve position.

According to the present invention, there is provided an exhaust gas recirculation control system, in which a fuel injection amount is determined on the basis of engine speed and engine load, and the throttle closed range is determined on the basis of engine speed and fuel injection amount. An exhaust gas recirculation control valve is operated by an electromagnetically operable valve actuator, the duty cycle of which is controlled by a control signal. The duty cycle of the valve actuator is variable in accordance with engine operation conditions, either in or out of the throttle close range.

In addition, according to the present invention, an electromagnetically operated actuator is associated with the throttle valve to control the operation of the latter. The actuator is operable between a throttle open position and a throttle-closed position to adjust the position of the throttle valve actuator depending on whether engine operation conditions are within or out of the throttle-closed range.

BRIEF DESCRIPTION OF THE DRAWINGS

The present invention will be understood more fully from the detailed description given herebelow and from the accompanying drawings of the preferred embodiments of the present invention, which, however, should not be taken as limitative to the invention but for elucidation and explanation only.

In the drawings.

DESCRIPTION OF THE PREFERRED EMBODIMENTS

Figure 1:
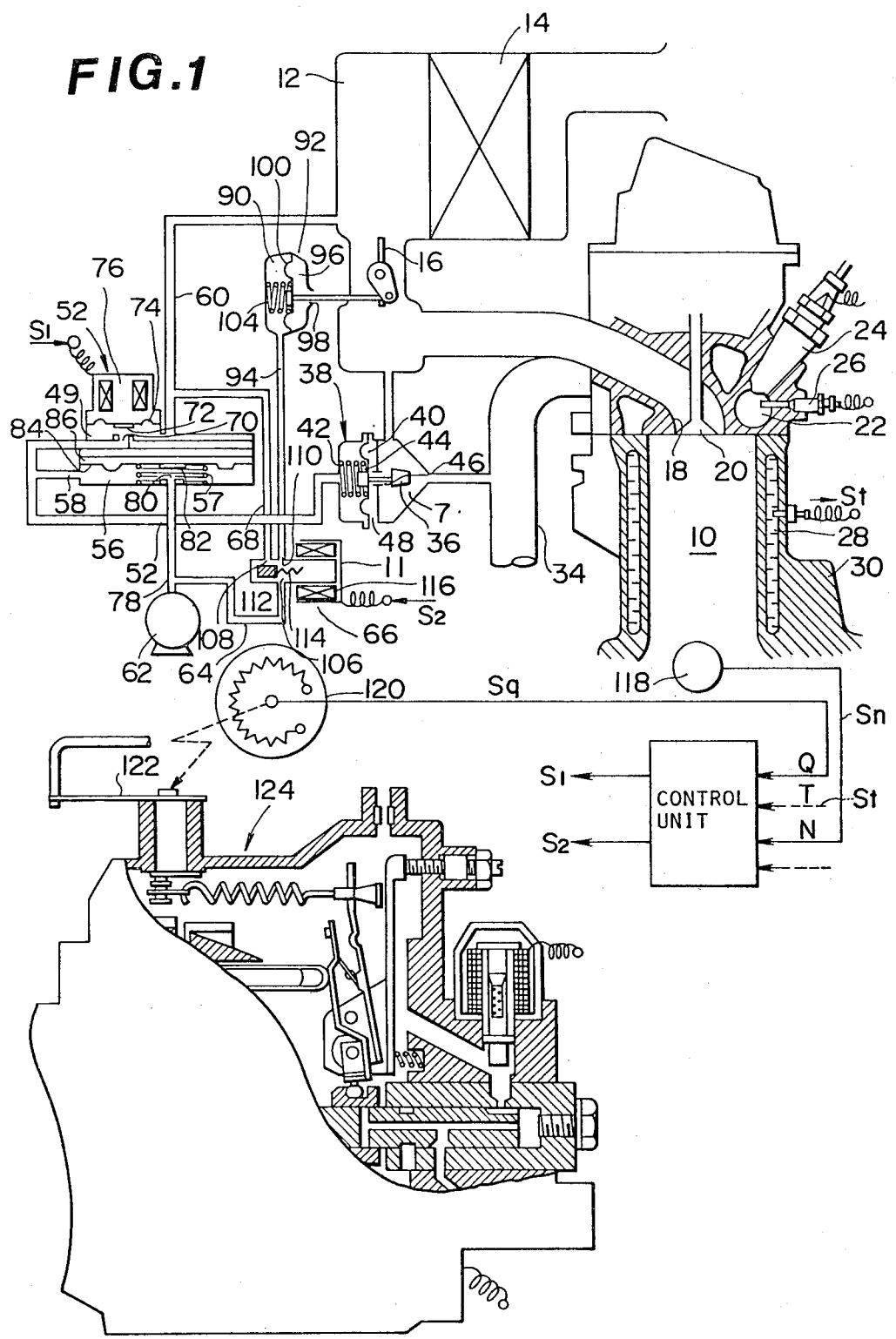
FIG. 1 is an illustration of the preferred embodiment of an exhaust gas recirculation control system for a diesel engine, according to the present invention.

Referring now to the drawings, particularly to FIG. 1, there is illustrated the preferred embodiment of an exhaust gas recirculation control system for an internal combustion engine, particularly for a diesel engine. In the shown embodiment, the engine has a combustion chamber 10 into which intake air is introduced via an air intake passage 12 with an air cleaner 14 and a throttle valve 16 and via an induction port 18 equipped with an intake valve 20. Also, fuel is introduced into the combustion chamber 10 via a pre-heating chamber 22 in which a fuel injector 24 and a glow plug 26 are provided. A controlled amount of fuel is injected into the pre-heating chamber 22 at a controlled timing and then introduced into the combustion chamber 10. An engine coolant chamber 28 into which an engine coolant temperature sensor 32 is inserted is formed in an engine cylinder block 30.

Exhaust gas produced in the combustion chamber 10 is exhausted through an exhaust passage 34 via an exhaust port (not shown) equipped with an exhaust valve (not shown). The exhaust passage 34 is connected to a point downstream of the throttle valve 16 in the air intake passage 12 for return of exhaust gas thereto. An exhaust gas recirculation control valve 36 for controlling the recirculation rate of the exhaust gas is inserted in the exhaust gas recirculation passage 34. The exhaust gas recirculation control valve 36 is associated with a diaphragm actuator 38. The valve actuator 38 has a pair of chambers 40 and 42 divided by a diaphragm 44 to which the exhaust gas recirculation control valve 36 is connected via a valve stem 46. The chamber 40 is exposed to atmospheric air via a port 48 and the chamber 42 is connected to one chamber 49 of a vacuum modulator 50 via a passage 52. In addition, the chamber 42 houses a spring 54 for providing an initial pressure to the diaphragm 44. The chamber 42 also communicates with a vacuum regulation chamber 55 of the vacuum modulator 50 via a passage 58.

The chamber 49 of the vacuum modulator 50 communicates with the air intake passage 12 upstream of the throttle valve 16 via a passage 60 for introduction of intake air thereinto. The chamber 49 also communicates with a vacuum pump 62 via a passage 64, a three-way electromagnetic valve 66 and a passage 68. The end 70 of the passage 52 mates with a valve member 72 attached to a resiliently deformable diaphragm 74. The movement of valve member 72 is controlled by an electromagnetic actuator 76. On the other hand, the vacuum regulation chamber 56 communicates with the vacuum pump 62 via a passage 78 having an end 80 mating with a valve member 82 attached to a diaphragm 84. The diaphragm 84 separates the vacuum regulation chamber 56 from a reference pressure chamber 86. A spring 88 is inserted into the chamber 56 to provide an initial pressure for the diaphragm 84.

The vacuum pump 62 also communicates with one chamber 90 of a throttle valve actuator 92 via the three-way electromagnetic valve 66 and a passage 94. The chamber 90 of the throttle valve actuator 92 is separated from the other chamber 96, to which atmospheric air is introduced via a port 98, by a diaphragm 100. The diaphragm 100 is connected to a throttle valve linkage 102 to operate the throttle valve 16. The diaphragm 100 is provided an initial pressure by a spring 104.

The three-way electromagnetic valve 66 has inlets 106 and 108 respectively connected to the passages 64 and 68 and outlet 100 connected to the passage 94. A thrusting valve 112 with a bias spring 114 is inserted in the three-way electromagnetic valve 66 for selectively establishing communication between one of the passages 64 or 68 and the passage 94 as controlled by an electromagnetic actuator 116.

The electromagnetic actuators 76 and 116 are connected to a control unit 200 to receive therefrom control signals $S_1$ and $S_2$. The control unit 200 is connected to the engine coolant temperature sensor 32 to receive therefrom a temperature signal $S_t$ indicative of the coolant temperature T and to an engine speed sensor 118 to receive therefrom an engine speed signal $S_n$ representative of the engine speed N. The control unit 200 is also connected to a load sensor 120 which is associated with a control lever 122 of a fuel injection pump 124, to receive a load signal $S_l$ representative of an engine load L.

The control unit 200 produces the control signal $S_1$ to be fed to the electromagnetic actuator 76 in pulse form. The control signal $S_1$ is indicative of the duty cycle, i.e., the ratio of the energized period to the deenergized period of the electromagnetic actuator 76. In the energized period, the electromagnetic actuator 76 pulls the valve member 72 and the diaphragm 74 to open the end 70 of the passage 52 and thereby draw intake air into the passage 52, and in the actuator 74 deenergized position, the valve closes the end 70. When this intake air enters the passage 52, the vacuum pressure from the vacuum regulation chamber 56 is reduced. The vacuum pressure in the vacuum regulation chamber 56 is regulated at a set pressure which is determined by the set pressure of the spring 57. Thus, the vacuum pressure to be introduced into the chamber 42 of the exhaust gas recirculation control valve actuator 38 varies in accordance with the duty cycle of the control signal $S_1$. The position of the exhaust gas recirculation control valve is controlled in accordance with the pressure difference between the chamber 42 and the chamber 40 to which atmospheric air is introduced. As a result, the exhaust gas recirculation control valve throttles the exhaust gas flowing through the exhaust gas recirculation passage to a controlled degree.

On the other hand, the control signal $S_2$ to be fed to the electromagnetic actuator 116 of the three-way valve is a digital, HIGH/LOW signal which energizes or deenergizes the latter. Depending on the energization and deenergization of the electromagnetic actuator 116, the thrusting valve 112 selectively establishes communication between the passage 94 and one of the passages 64 or 68 to selectively supply atmospheric air from the air induction passage 12 or vacuum pressure from the vacuum pump 62, to the chamber 90 of the throttle valve actuator 92. In the shown embodiment, the passage 64 communicates with the passage 94 to introduce atmospheric air into the chamber 40 when the electromagnetic actuator 116 is energized by a HIGH control signal $S_2$. On the other hand, when the control signal $S_2$ is LOW and thus the electromagnetic actuator 116 is deenergized, the passage 68 communicates with the passage 94 to introduce the vacuum pressure therethrough, via the three-way electromagnetic valve 66. When the vacuum pressure is introduced, the throttle valve linkage 98 is pulled toward the left in FIG. 1 to move the throttle valve 76 to a half-throttle position. On the other hand, if atmospheric air is supplied thereto, the throttle valve linkage 98 is pushed toward the right in FIG. 1 to move the throttle valve to a full throttle position.

Figure 2:
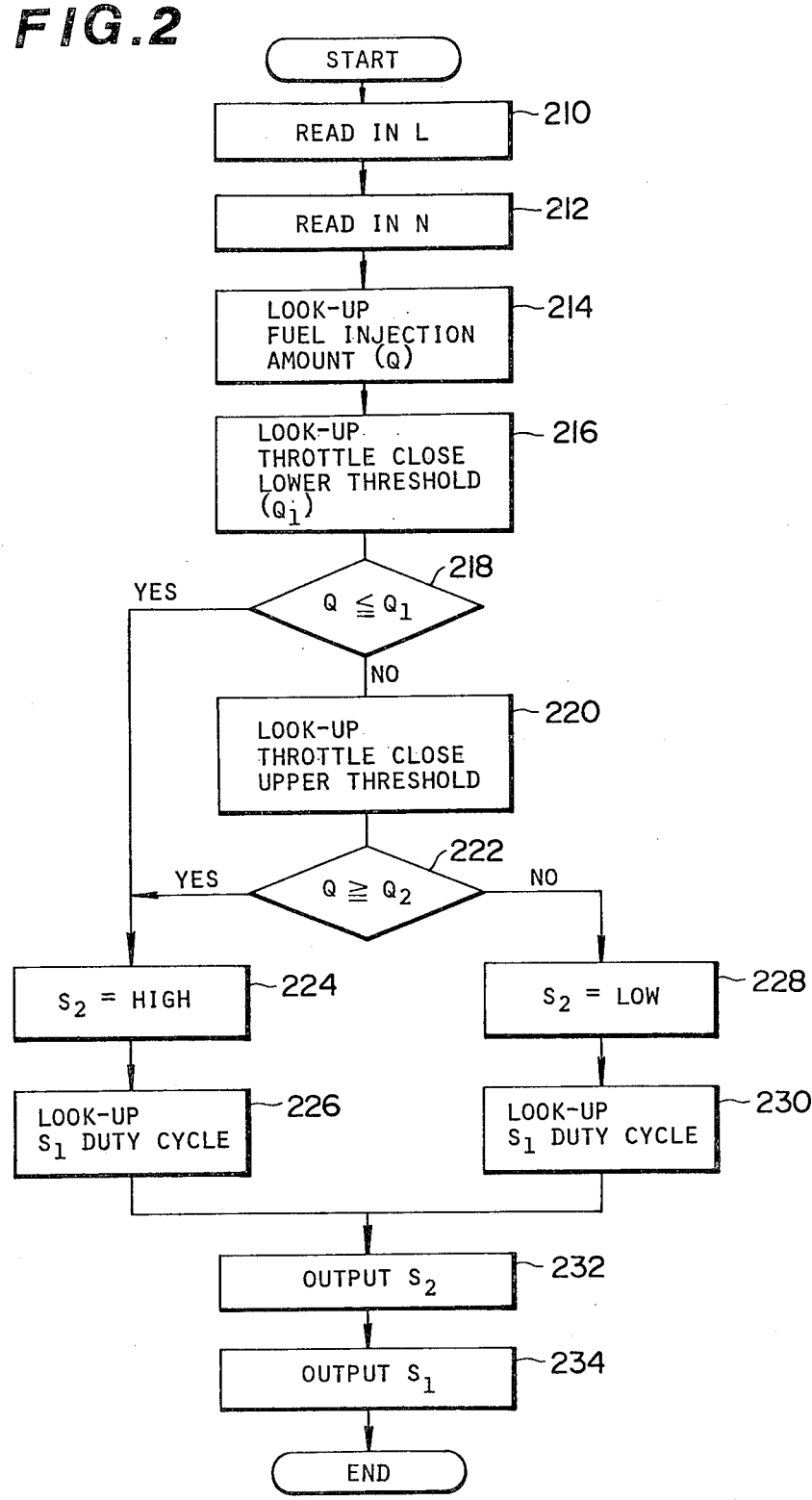
FIG. 2 is a flowchart of an exhaust gas recirculation control program to be executed in the control system of FIG. 1.

The operation of the control unit 200 to determine the control signals $S_1$ and $S_2$ will be described in detail with reference to FIGS. 2 to 6. FIG. 2 is a flowchart of an exhaust gas recirculation control program to be executed by the control unit 200, which comprises a microcomputer. The exhaust gas recirculation control program may be executed in the control unit at regular intervals in synchronism with the engine revolution. After starting the program, the valve L of the load signal $S_l$ from the engine load sensor 120 is read into a corresponding address of a RAM (not shown) in the control unit 200, at a step 210. Similarly, the value N of the engine speed signal $S_n$ from the engine speed sensor 118 is read into a corresponding address of the RAM, at a step 212. Then, based on the engine load L and the engine speed N, a fuel injection quantity table as shown in FIG. 3 is referred to in order to determine the fuel injection quantity used in controlling the fuel injection pump 124, at a step 214.

Figure 3:
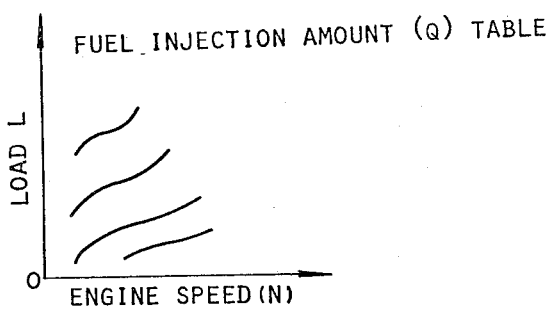
FIG. 3 is a graph showing a variation of the fuel injection amount in relation to engine speed and engine load.
Figure 4:
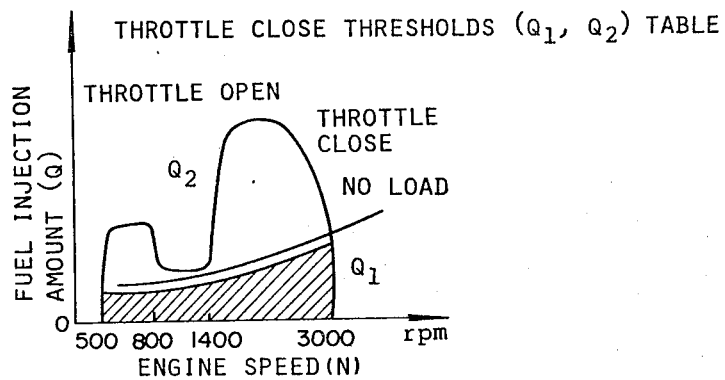
FIG. 4 is a graph of the variation of throttle close threshold in relation to fuel injection amount and engine speed.

As will be appreciated, the fuel injection. quantity table of FIG. 3 is prestored in a corresponding area of a ROM (not shown) in the control unit. The manner of the fuel injection quantity determination is per se well known and disclosed in various prior art documents. For example, Based on the fuel injection quantity Q and the engine speed N, a throttle-close threshold table in the ROM, as shown in FIG. 4, is referred to in order to determine the throttle-close lower threshold $Q_1$, at a step 216. Thereafter, the fuel injection amount Q is compared to the throttle-close lower threshold $Q_1$, at a step 218. If the fuel injection amount Q is equal to or greater than the throttle-close lower threshold $Q_1$, the throttle-close threshold table is again looked-up to determine a throttle-close upper threshold $Q_2$ based on the fuel injection amount Q and the engine speed N, at a step 220. The throttle-close upper threshold $Q_2$ is compared to the fuel injection amount Q, at a step 222. If the fuel injection amount Q is less than the throttle-close lower threshold $Q_1$ at the step 218 or is greater than the throttle-close upper threshold $Q_2$ at the step 222, then the control signal $S_2$ is set to the HIGH level to set the throttle valve 16 to the full-throttle position, i.e., fully open, at a step 224. Alternatively, if the fuel injection amount Q is equal to or less than the throttle close upper threshold at the step 222, then, the control signal $S_2$ is set to the LOW level to set the throttle valve 16 to the half-throttle position in order to reduce the path area of the air induction passage 12, at a step 228.

As will be appreciated, in the full-throttle position to provide a full path area of the air induction passage, the exhaust gas recirculation rate is relatively low in relation to the air flow rate, which engine condition will be referred to as "LOW-EGR range" hereinafter. On the other hand, in the half-throttle position providing a limited path area, the exhaust gas recirculation rate is relatively high in relation to the air flow rate, which engine condition will be referred to hereinafter as "HIGH-EGR range". As can be appreciated from FIG. 4, the engine will be in the HIGH-EGR range while the load condition is relatively low. Therefore, the range defined by the throttle close upper and lower thresholds $Q_2$ and $Q_1$ is the low engine load range for a relative high of exhaust gas recirculation rate. In the LOW EGR range, the range below the throttle-close lower threshold $Q_1$ represents the state in which the engine is being driven by the vehicle, such as during engine braking. In this range, the exhaust gas recirculation rate will remain LOW or zero in order to hold engine roughness to within an acceptable range and for preventing the engine from stalling. On the other hand, the range above the throttle-close upper threshold is the substantially high engine load state occurring when high engine output is required. To maintain a high engine output, the exhaust gas recirculation rate remains at a low level.

Figure 5:
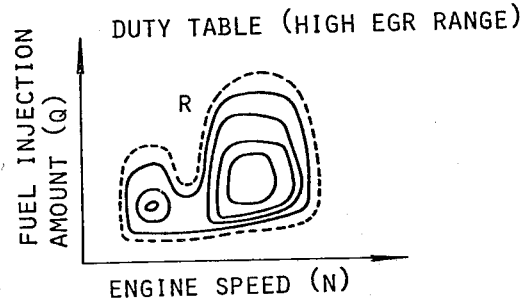
FIG. 5 is a table for determining the duty cycle of a control signal to be applied to an exhaust gas recirculation control valve actuator in the HIGH EGR range of engine operation.

Returning to FIG. 2, in the HIGH-EGR range, a step 226 is performed following the step 224. In the step 226, a HIGH-EGR range duty table, as shown in FIG. 5, stored in the ROM is referred to with respect to the engine speed N and the fuel injection amount Q. In the duty table of FIG. 5, the broken line R defines the border between the HIGH-EGR range and the LOW-EGR range, and the hatched area defines the engine operational range in which the exhaust gas recirculation rate becomes 100% by setting the on-duty of the control signal $S_1$ to 0%. Therefore, in FIG. 2, the on-duty of the control signal $S_1$ is increased toward hatched full-EGR range. Increase of the on-duty of the control signal reduces the ratio of closed time to open time of the valve member 72 with regard to the end 70 of the passage 52 to increase the vacuum pressure to be applied to the chamber 42 of the exhaust gas recirculation control valve.

Figure 6:
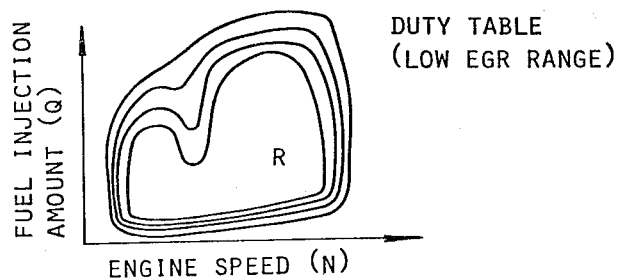
FIG. 6 is a similar table for determining the duty cycle of the control signal in the LOW EGR range of engine operation.

When the engine is in the LOW-EGR range, a step 230 is performed following the step 228. In the step 230, a LOW-EGR range duty table, as shown in FIG. 6, in the ROM, is referred to in order to determine the duty cycle of the control signal $S_1$, based on the engine speed N and the fuel injection amount Q. In this table, the range defined by line R is the foregoing HIGH-EGR range boundary, and range outside of the outermost line is the NO-EGR range in which the duty cycle of the control signal $S_1$ is 100%. As will be appreciated, the on-duty of the control signal $S_1$ is decreased towards the range defined by R.

As previously set forth, the duty cycle of the control signal $S_1$ is determined at the step 226 or 230 depending on whether the engine is in the HIGH-EGR range or in the LOW-EGR range. After these steps, the control signals $S_2$ and $S_1$ are produced and outputted to the electromagnetic actuators 116 and 76, at steps 232 and 234, respectively.

Therefore, according to the foregoing embodiment, the exhaust gas recirculation rate can be controlled continuously in accordance with engine operating conditions.

Figure 7:
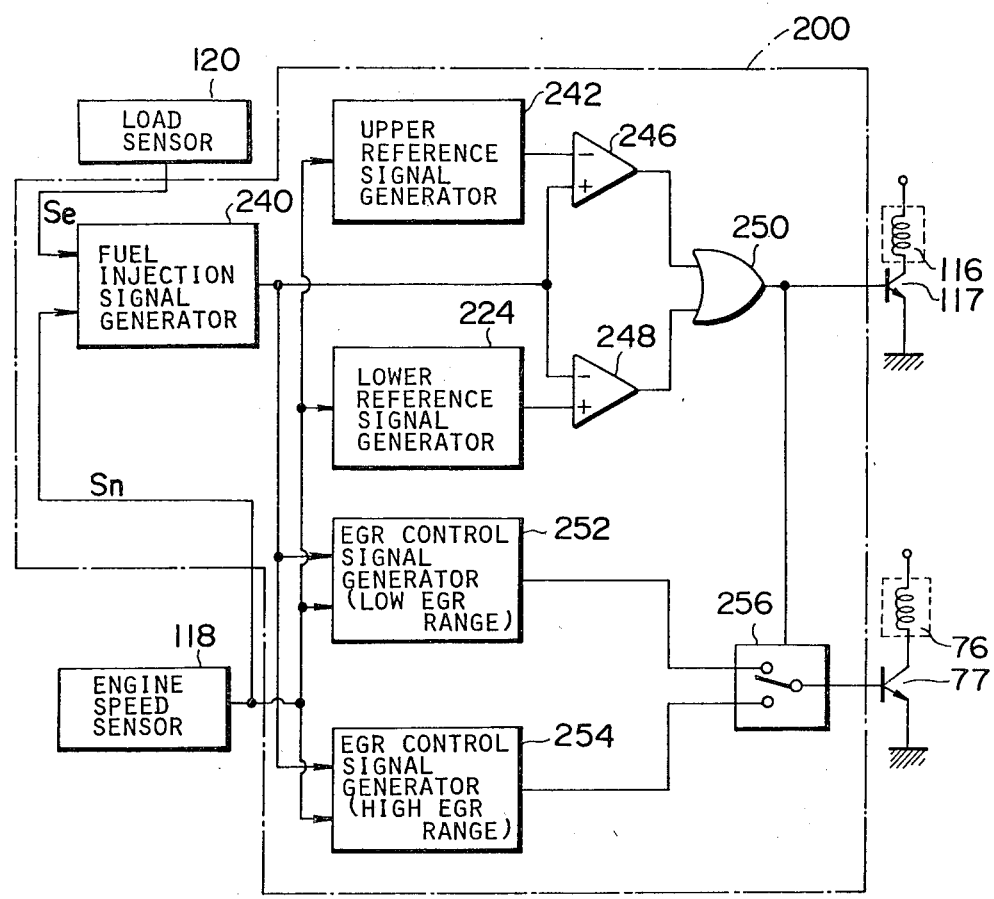
FIG. 7 is a block diagram of a control unit of the exhaust gas recirculation control system according to the second embodiment of the invention.

Referring to FIG. 7, there is shown the second embodiment of the exhaust gas recirculation rate control system of the present invention. In this embodiment, the load sensor 120 and the engine speed sensor 118 are connected to a fuel injection signal generator 240 in the control unit 200 to respectively input the load signal $S_t$ and the engine speed signal $S_n$. On the basis of the load signal $S_t$ and the engine speed signal $S_n$, the fuel injection signal generator 240 produces a fuel injection control signal $S_q$ to be fed to the fuel injection pump for controlling the fuel quantity to be injected.

On the other hand, the engine speed signal $S_n$ of the engine speed sensor 118 is also fed to an upper reference signal generator 242 and lower reference signal generator 244. The upper reference signal generator 242 produces an upper reference signal $S_{q2}$ representative of the throttle-close upper threshold $Q_2$, which varies in accordance with engine speed N. Similarly, the lower reference signal generator 244 produces a lower reference signal $S_{q1}$ representative of the throttle-close lower threshold $Q_1$, which also varies in accordance with engine speed N. The fuel injection signal value Q is compared to the upper and lower reference signal values $Q_2$ and $Q_1$ in corresponding comparators 246 and 248. The comparator 246 is adapted to produce a HIGH level output $S_{c2}$ when the fuel injection signal value Q is equal to or greater than the upper reference signal value $Q_2$ and a LOW level output otherwise. On the other hand, the comparator 248 is adapted to respond to the fuel injection signal value Q being equal to or less than the lower reference signal value $Q_1$ to produce a HIGH level output $S_{c1}$. If the fuel injection signal value Q is greater than the lower reference signal value $Q_1$, then the comparator output $S_{c1}$ goes LOW.

Both of the comparator outputs $S_{c2}$ and $S_{c1}$ are fed to an OR gate 250, the output terminal of which is, in turn, connected to the base electrode of a transistor 117. When either of the comparator outputs $S_{c2}$ and $S_{c1}$ is HIGH, that is, when the fuel injection signal value Q is out of throttle-close range defined by the throttle-close upper and lower thresholds $Q_2$ and $Q_1$, the output $S_g$ of the OR gate 250 goes HIGH to turn the transistor 117 on and energize the electromagnetic actuator 116 so as to fully open the throttle valve. When the fuel injection signal value Q is within the throttle-close range, then, the output $S_g$ goes LOW to turn the transistor 117 off and deenergize the electromagnetic actuator 116. As a result, the throttle valve moves to the half-throttle position.

The load signal $S_l$ and the engine speed signal $S_n$ are also inputted to EGR (exhaust gas recirculation) control signal generators 252 and 254. The EGR control signal generator 252 is adapted to determine the exhaust gas recirculation rate in the LOW-EGR range on the basis of the load signal value L and the engine speed signal value N, to produce a control signal $S_{11}$ indicative of the desired duty cycle of the electromagnetic actuator 76. The EGR control signal generator 254 determines the exhaust gas recirculation rate in the HIGH-EGR range to produce a control signal $S_{12}$ indicative of the desired duty cycle of the electromagnetic actuator 76.

Both of the control signals are fed to a switching circuit 256 which, in turn, receives the output $S_g$ of the OR gate 250. If the output $S_g$ is HIGH, the switching circuit 256 establishes communication between the EGR control signal generator 254 and the base electrode of a transistor 77. On the other hand, the switching circuit 256 establishes communication between the EGR control signal generator 254 and the base electrode of transistor 77 when the OR gate signal $S_g$ is LOW.

The selected one of the control signals $S_{11}$ and $S_{12}$ applied to the base electrode of the transistor 77 turns the same ON when the signal level is HIGH and turns it OFF when the signal level is LOW. As a result, the electromagnetic actuator 76 is alternatively energized and deenergized to control the throttling rate of the exhaust gas recirculation control valve.

As previously set forth, according to the present invention, the exhaust gas recirculation rate can be controlled to strict follow engine operational conditions in order to reduce noxious exhaust emissions, particularly upon restarting of the engine after the engine has previously been warmed-up.

Thus, the present invention fulfills all of the objects and advantages sought therefor.

What is claimed is:

1. An exhaust gas recirculation control system for an internal combustion engine comprising:
    a first sensor for producing a first sensor signal representative of engine revolution speed;
    a second sensor for producing a second sensor signal representive of the load on the engine;
    first means for controlling a fuel injection amount based on said first and second sensor signal values, said first means producing a first control signal indicative of the fuel injection amount;
    second means for controlling an intake air flow rate between a first full rate condition and a second limited-rate condition, said second means including a first actuator operative between first position and a second position to operate said second means between said first full-rate condition and said second limited-rate condition, said first position of said first actuator corresponding to said first full-rate condition of said second means and said second position thereof corresponding to said second limited-rate condition;
    third means for controlling a throttling rate of an exhaust gas recirculation passage on the basis of said first sensor signal value and said first control signal value, said third means including a second actuator for operating said third means to control said throttling rate; and
    fourth means for producing second and third control signals respectively adapted to be applied to said first and second actuators, said fourth means determining a first engine operation range in which said first means is to be operated in said second limited-rate condition on the basis of first signal value and said first control signal value and producing said second control signal for controlling said first actuator in one of said first and second positions depending upon the engine operating condition within or out of said first range, said fourth means determining the duty cycle of said third control signal for controlling the operation of said second actuator on the basis of said first sensor signal value and said first and second control signal values.

2. The control system as set forth in claim 1, wherein said second means comprises a diaphragm actuator having a pressure chamber connected to a first high-pressure source and a second low-pressure source, a pressure control valve associated with said first actuator and operable between a first and a second position depending on said second control signal value, said pressure control valve being interpositioned between said diaphragm actuator and said pressure sources to establish communication between said first high-pressure source and said pressure chamber when operated in its first position and to establish communication between said second low-pressure source and said pressure chamber when operated in its second position.

3. The control system as set forth in claim 1, wherein said third means includes a diaphragm actuator having a pressure chamber connected to a first high-pressure source and a second low-pressure source, and a valve associated with said second actuator for controlling the rate of introduction of a high pressure into said pressure chamber depending upon the duty cycle of said third control signal.

4. The control system as set forth in claim 2, wherein said third means including first and second control signal generators adapted to determine the duty cycle of the third control signal, said first control signal generator being responsive to said second control signal to operate said second means in said first full-rate condition in order to produce said third control signal on the basis of the first sensor signal value and first control signal value, and said second control signal generator is responsive to said second control signal for operating said second means in said second limited-rate condition in order to produce said third control signal on the basis of said first sensor signal value and said first control signal value.

5. An exhaust gas recirculation control system for a diesel engine comprising:

an air induction passage for introducing an intake air and an exhaust passage;

an exhaust gas recirculation passage for introducing exhaust gas into said air induction passage;

a throttle valve provided in said air induction passage and movable between a full-throttle position providing a maximum path area and a half-throttle position providing a limited path area;

an exhaust gas recirculation control valve disposed within said exhaust gas recirculation passage for controlling the exhaust gas recirculation rate;

an engine speed sensor producing an engine speed signal;

an engine load sensor producing an engine load signal;

a fuel injection pump for delivery of a controlled amount of fuel to the engine;

a throttle valve actuation means for operating said throttle valve between said full-throttle position and said half-throttle position;

an exhaust gas recirculation control valve actuation means for actuating said exhaust gas recirculation control valve; and a control unit producing a fuel injection amount control signal indicative of a fuel injection amount determined on the basis of said engine speed signal value and said engine load signal value, said control unit defining a full-throttle range and a half-throttle range on the basis of said engine speed signal value and said fuel injection amount control signal value to produce a throttle valve control signal variable to either of a HIGH level and a LOW level to activate and deactivate said throttle valve actuation means, and said control unit determining the duty cycle of said exhaust gas recirculation valve actuation means on the basis of said engine speed signal value and said fuel injection amount control signal value to produce an exhaust gas recirculation control signal indicative of the determined duty cycle.

6. The control system as set forth in claim 5, wherein said control unit includes first and second exhaust gas recirculation control signal generators, said first generator is responsive to said HIGH level throttle valve control signal to determine the duty cycle of the exhaust gas recirculation control signal and said second generator is responsive to said LOW level throttle valve control signal to determine the duty cycle of the exhaust gas recirculation control signal.

7. The control system as set forth in claim 6, wherein said both of said throttle valve actuation means and said exhaust gas recirculation control valve actuation means include a diaphragm actuator defining pressure chambers, each of which communicates with said air induction passage and a vacuum source, said diaphragm actuator of said throttle valve actuation means being adapted to selectively introduce one of said intake air and said vacuum into said pressure chamber depending on said throttle valve control signal, and said diaphragm actuator of said exhaust gas recirculation control valve actuation means being adapted to mix a controlled amount of intake air with a constant pressure of said vacuum to modulate a control pressure to be applied to said pressure chamber thereof in accordance with the duty cycle of the exhaust gas recirculation control signal.

8. The control system as set forth in claim 7, wherein said first and second exhaust gas recirculation control signal generators respectively include duty tables respectively storing duty cycle data to be read out in relation to the engine speed signal value and the fuel injection amount control signal value.

9. In an exhaust gas recirculation system for an diesel engine which includes an air induction passage, an exhaust passage, an exhaust gas recirculation passage, a throttle valve disposed in said air induction passage, an exhaust gas recirculation control valve disposed in said exhaust gas recirculation passage, a first valve actuator means for operating said throttle valve, a second valve actuator means for operating said exhaust gas recirculation control valve, an engine speed sensor producing an engine speed signal, an engine load sensor producing an engine load signal, and a fuel injection pump metering fuel in a controlled amount which is determined on the basis of said engine speed signal value and said engine load signal value, a method for controlling exhaust gas recirculation comprising the steps of:

determining a throttle-close range on the basis of engine speed and the determined fuel injection amount;

checking the fuel injection amount if it is within said throttle-close range and closing said throttle valve if the fuel injection amount is within said throttle-close range and opening the throttle valve otherwise;

determining a control signal for said second valve actuator and indicative of the desired duty cycle of said second valve actuator on the basis of said engine speed and said fuel injection amount, which duty cycle of said control signal varies in accordance with said engine speed and said fuel injection amount; and controlling a throttling ratio of said exhaust gas recirculation valve in accordance with said control signal by cyclically activating and deactivating said second valve actuator in accordance with the duty cycle of the control signal.

10. The method as set forth in claim 9, wherein said throttle valve is operated between a first fully-opened position and a second partially-closed position depending on whether the fuel injection amount within or out of said throttle close range.

11. The method as set forth in claim 9, wherein said duty cycle of said control signal is determined by referring to a duty table with respect to the engine speed and the fuel injection amount.

12. The method as set forth in claim 11, wherein said duty table has first portions to be referred to when said throttle valve is in said first position and second portions to be referred to when said throttle valve is in said second position.

13. The method as set forth in claim 10, wherein said first valve actuator which is controlled by a pressure introduced thereto.

14. The method as set forth in claim 12, wherein said second valve actuator is operated by a control vacuum pressure which is controlled in accordance with the duty cycle of the control signal.

* * * * *